P. A. McCARTY.
TRICYCLE PROPELLING MECHANISM.
APPLICATION FILED JULY 1, 1912.
1,078,056.
Patented Nov. 11, 1913.
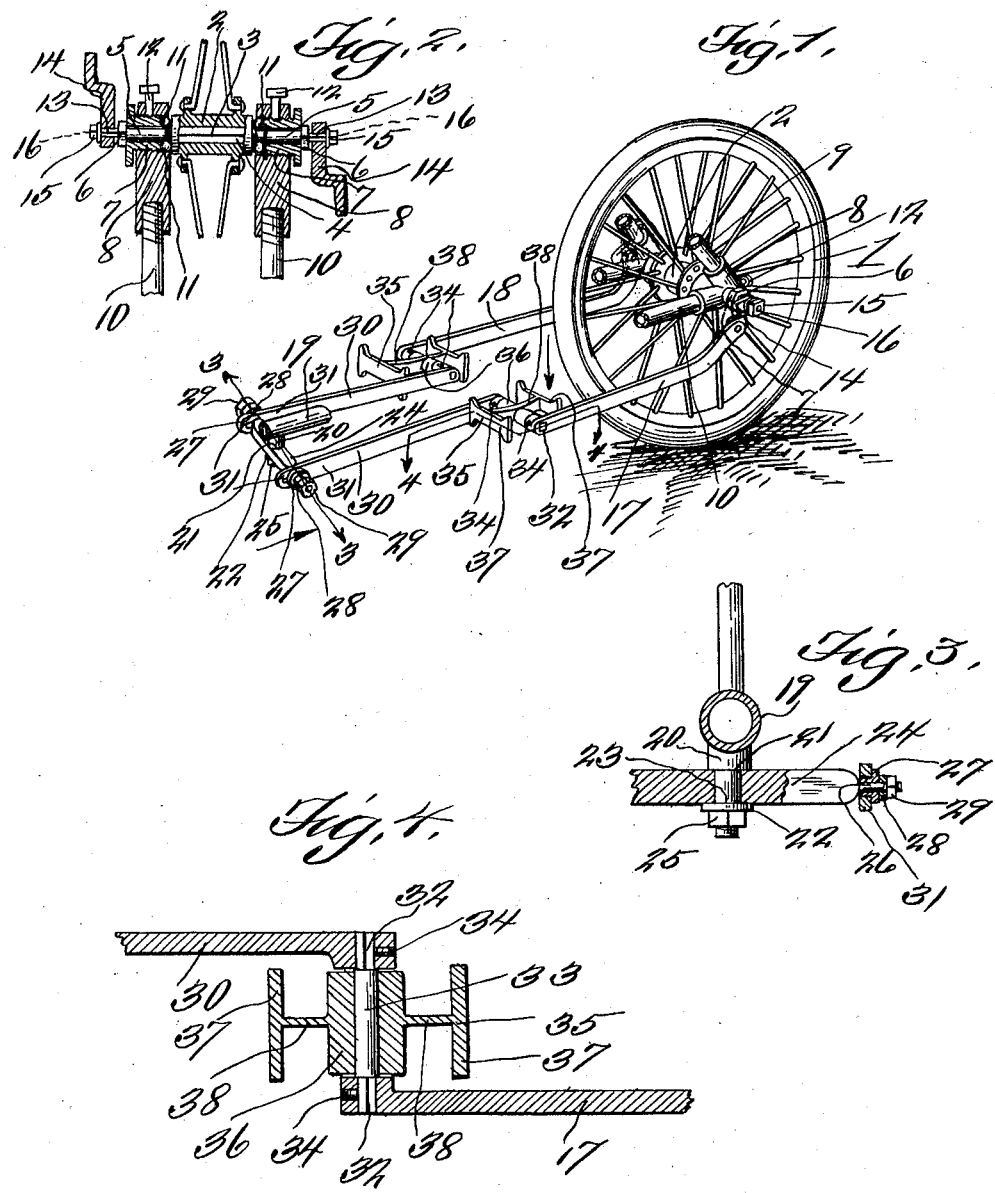
Witnesses
Edward S. Ford.
C. E. Clements.
Inventor
Patrick A. McCarty,
By R. A. Boswell Ales.,
his Attorneys

UNITED STATES PATENT OFFICE.

PATRICK A. McCARTY, OF HONESDALE, PENNSYLVANIA.

TRICYCLE PROPELLING MECHANISM.

1,078,056.  Specification of Letters Patent.  Patented Nov. 11, 1913.

Application filed July 1, 1912. Serial No. 707,015.

*To all whom it may concern:*

Be it known that I, PATRICK A. McCARTY, a citizen of the United States of America, residing at Honesdale, in the county of Wayne and State of Pennsylvania, have invented a new and useful Tricycle Propelling Mechanism, of which the following is a specification.

This invention relates to a new and useful propelling mechanism for tricycles and the like, such as set forth and shown in the application filed August 13, 1910, Serial No. 577,001.

The principal object of the invention is the production of a device of this nature, in which essential, desirable and practical features of construction exist.

The features of construction are hereinafter set forth, shown in the drawings and claimed.

In the drawings, Figure 1 is a view in perspective of the propelling mechanism as applied to the rear wheel of a tricycle (not particularly shown). Fig. 2 is a sectional view through a portion of the hub of the wheel shown in Fig. 1, showing the construction for holding the ball bearings for the axle of the wheel. Fig. 3 is a sectional view on line 3—3 of Fig. 1. Fig. 4 is a sectional view on line 4—4 of Fig. 1, showing the construction of the pedals.

Referring to the drawings, 1 designates the rear wheel of a tricycle not shown, the hub 2 of which receives the rectangular portion 3 of the axle 4, each end of which terminates in a cylindrical portion 5, to which a nut 6 is threaded. The cylindrical portions 5 are mounted in the bushings 7 which are threaded in the unions 8 of the rear forks 9 and 10 of the tricycle (not shown). Interposed between the bushings and the hub of the wheel, ball bearings 11 are arranged. Set bolts 12 are threaded through the unions 8, in order to engage the threads of the bushings 7, so as to lock them in place.

The cylindrical portions 5 are provided with extensions 13 which are rectangular in cross section, and mounted upon the extensions 13 are the arms 14, there being nuts 15 engaging threaded portions 16 of the extensions 13, for holding the arms 14 in place. Pivoted to the free ends of the arms 14 are links 17 and 18.

The form of tricycle to which this propelling mechanism is applied is provided with a lower horizontal bar or tube 19, such as that shown in the above specified application. Projecting downwardly from this tube is a lateral projection 20 having a shoulder 21, between which and the washer 22, which contacts with the shoulder 23, an oscillating bar 24 is arranged. The washer 22 is held in position by the nut 25, which is threaded to the extremity of the extension 20. This oscillating bar 24, at each end, is provided with an extension 26, to receive a sleeve 27. The sleeves 27 are held in position by the nuts 28 and the lock nuts 29. Bars 30, at their ends 31, receive the sleeves 27. The sleeves 27 are provided for the purpose of permitting the bars 30 to easily move. The adjacent ends of the links 17 and 18 and the bars 30 are connected to the rectangular portions 32 of the pin 33, there being set screws 34 penetrating the ends of the links 17 and 18 and the bars 30, so as to engage the rectangular portions 32. The pedals 35 comprise the body sleeves 36 and the lateral portions 37, which are connected to the sleeve 36 by the webs 38.

In propelling the tricycle, pressure is applied upon the pedals, and when such is the case, the arms, which extend in opposite directions from the axle of the wheel, move, in order to rotate the axle and the wheel. The pedals, when they are depressed, also move slightly forward, because of the connection between the bars 30 and the tube 19.

The invention having been set forth, what is claimed as new and useful is:—

In a propelling mechanism, unions of the frame of a tricycle, bushings threaded in the unions, an axle having a central portion rectangular in cross section, a drive wheel upon the rectangular portion, the axle having cylindrical extensions mounted in the bushings, ball bearing between the ends of the hub of the wheel and the bushings, the extensions having other extensions rectangular in cross section, arms secured upon the latter rectangular extensions, and pedal connections connected to the arms.

In witness whereof, I hereunto affix my signature in the presence of two witnesses.

PATRICK A. McCARTY.

Witnesses:
MARY W. HAM,
LENA HIRT.

Copies of this patent may be obtained for five cents each, by addressing the "Commissioner of Patents, Washington, D. C."